(12) United States Patent
Worthington

(10) Patent No.: US 11,517,835 B1
(45) Date of Patent: *Dec. 6, 2022

(54) SELF-CONTAINED FILTER ASSEMBLY FOR MAGNETIC DEBURRING AND POLISHING MACHINE

(71) Applicant: Techniks, LLC, Indianapolis, IN (US)

(72) Inventor: Scott Worthington, Flat Rock, IN (US)

(73) Assignee: Techniks, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,770

(22) Filed: May 31, 2022

Related U.S. Application Data

(62) Division of application No. 17/392,967, filed on Aug. 3, 2021, now Pat. No. 11,376,531.

(51) Int. Cl.
- *B01D 35/06* (2006.01)
- *B01D 35/26* (2006.01)
- *B01D 29/23* (2006.01)
- *B01D 35/02* (2006.01)

(52) U.S. Cl.
CPC .............. *B01D 35/06* (2013.01); *B01D 29/23* (2013.01); *B01D 35/02* (2013.01); *B01D 35/26* (2013.01); *B01D 2201/287* (2013.01); *B01D 2201/4069* (2013.01)

(58) Field of Classification Search
CPC ........ B01D 35/06; B01D 35/02; B01D 35/26; B01D 29/23; B01D 2201/287; B01D 2201/4069; B24B 31/00; B24B 19/00; E04H 3/16
USPC ......... 210/348, 169, 282, 416.2, 493.1, 456, 210/416.4, 493.5, 222, 223, 167, 168, 210/249, 416.1, 418, 420, 416.3, 416.5, 210/443
See application file for complete search history.

(56) References Cited

U.S. PATENT DOCUMENTS

| | | | | |
|---|---|---|---|---|
| 4,601,821 A | * | 7/1986 | Sherman | A01K 63/047 210/493.1 |
| 5,044,128 A | * | 9/1991 | Nakano | B24B 31/108 451/328 |
| 5,662,516 A | * | 9/1997 | You | B24B 31/102 451/104 |

* cited by examiner

*Primary Examiner* — Akash K Varma
(74) *Attorney, Agent, or Firm* — Shuttleworth & Ingersoll, PLC; Jason Sytsma

(57) ABSTRACT

A filter housing comprising an inlet and an outlet, an impeller positioned inside the filter housing magnetically coupled to a rotating magnetic field created by the magnetic disc when rotated by the motor, wherein rotation of the magnetic disc rotates the impeller which draws the solution through the inlet of the filter housing and push the solution out a first filter and out the outlet of the filter housing.

20 Claims, 4 Drawing Sheets

SELF-CONTAINED FILTER ASSEMBLY FOR MAGNETIC DEBURRING AND POLISHING MACHINE

PRIORITY CLAIM

This application is a division of U.S. patent application Ser. No. 17/392,967 filed Aug. 3, 2021, the contents of which are hereby incorporated by reference herein.

TECHNICAL FIELD

This invention relates to filters for use with polishing and deburring machines, more specifically to a self-contained filter assembly for a magnetic deburring and polishing machine.

BACKGROUND INFORMATION

Metal workpieces have burrs that have been leftover during a mechanical machining process. Removal of such burrs helps to prevent injury to workers and improves the appearance of the workpieces. The burrs left in the side walls of holes or grooves of the metal workpieces, especially on some small workpieces, are removed by manual deburring one at a time. However, the whole procedure of manual deburring is both time and labor consuming. This is especially true for small intricate parts. In addition, the workpieces are easily damaged during the manual deburring treatment procedure.

In order to solve this problem, magnetic barrel tumblers have been devised that polish workpieces by utilizing variations in the magnetic field occurring during the rotation of a magnetic disc attached with magnets, water and a deburring solution. The workpieces are placed in a non-magnetic tub containing a media of magnetic particles, which remove sharp edges by peening the surface until the burr falls off or the edge is reshaped into a more rounded profile. The tub is positioned above a magnetic disc on a table top with a spacing underneath so that the magnet disc is out of contact with the bottom of the tub. The magnet disc is then rotated at high speed.

The magnetic particles provided in the tub above the magnet disc may be slightly magnetized and attracted by the magnet disc. Since the magnet disc is rotated at high speed, magnetic fields created by the rotating magnet disc momentarily alternate so that the magnetic abrasive particles or the permanent magnets are attracted to an approaching magnetic field created by the magnet disc and so that a different magnetic field then approaches the magnetic abrasive particles of the permanent magnets. Thus, the magnetic particles jump around and helicopter inside and outside of every surface of the workpieces removing any burrs and polishing them in the process.

This process works well for most parts; however, parts made from aluminum and stainless steel tend to blacken the water very quickly. This can cause the aluminum or stainless steel parts to have a tarnished appearance.

Accordingly, there is a need for a filter assembly that will clean the water during operation to prevent discoloration of the workpieces.

SUMMARY

In accordance with one aspect of the present invention, a magnetic barrel tumbler is provided with a motor, a magnetic disc attached to the motor, a plate positioned above the magnetic disc, and a tub positioned on top of the plate for receiving a solution, magnetic particles, and work pieces. Inside the tub is a filter assembly comprising a filter housing comprising an inlet and an outlet, an impeller positioned inside the filter housing magnetically coupled to a rotating magnetic field created by the magnetic disc when rotated by the motor, wherein rotation of the magnetic disc rotates the impeller which draws the solution through the inlet of the filter housing and push the solution out a first filter and out the outlet of the filter housing.

The impeller can comprise a plurality of magnets that magnetically couple the impeller to the rotating magnetic field. A plurality of slits extend from the outer diameter of the impeller to a concentric through hole with the number of slits corresponding to the number of magnets.

The filter assembly can further comprise an impeller housing for housing the impeller. The impeller housing can be positioned between the inlet of the filter housing and the first filter. The impeller housing can comprise a lower cover comprising an opening aligned with the inlet of the filter housing, a top cover comprising an opening through which fluid is pushed out of the impeller housing to the first filter. The impeller is positioned inside the impeller housing between the lower cover and the top cover with a space between an outer diameter of the impeller and an inner wall of the impeller housing. Rotation of the impeller draws fluid through the inlet of the filter housing and accelerates the fluid toward the outer diameter of the impeller and out the opening in the top cover to the first filter.

In an embodiment, a rod can hold the filter assembly together by extending from a top of the filter housing to a bottom of the filter housing. One or more bearings can be positioned in the through hole of the impeller through which the rod extends.

In an embodiment, the opening of the top cover of the impeller housing can extend into the through hole of the first filter such that solution is pushed out the opening of the top cover of the impeller housing into the through hole of the first filter and out the side of the first filter and out the out the outlet of the filter housing. A one-way valve can be positioned on top of the opening in the top cover of the impeller housing to prevent solution from flowing back into the impeller housing.

In an embodiment, the filter assembly can comprise a spacer near the inlet of the filter housing to raise the inlet of the filter housing a sufficient distance off the bottom of the tub to receive solution through the inlet of the filter housing yet block work pieces from entering the inlet of the filter housing. In an embodiment, the heads of screws used to combine the impeller housing to the lower cover of the filter assembly can be used as the spacer to raise the inlet off the bottom of the tub.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
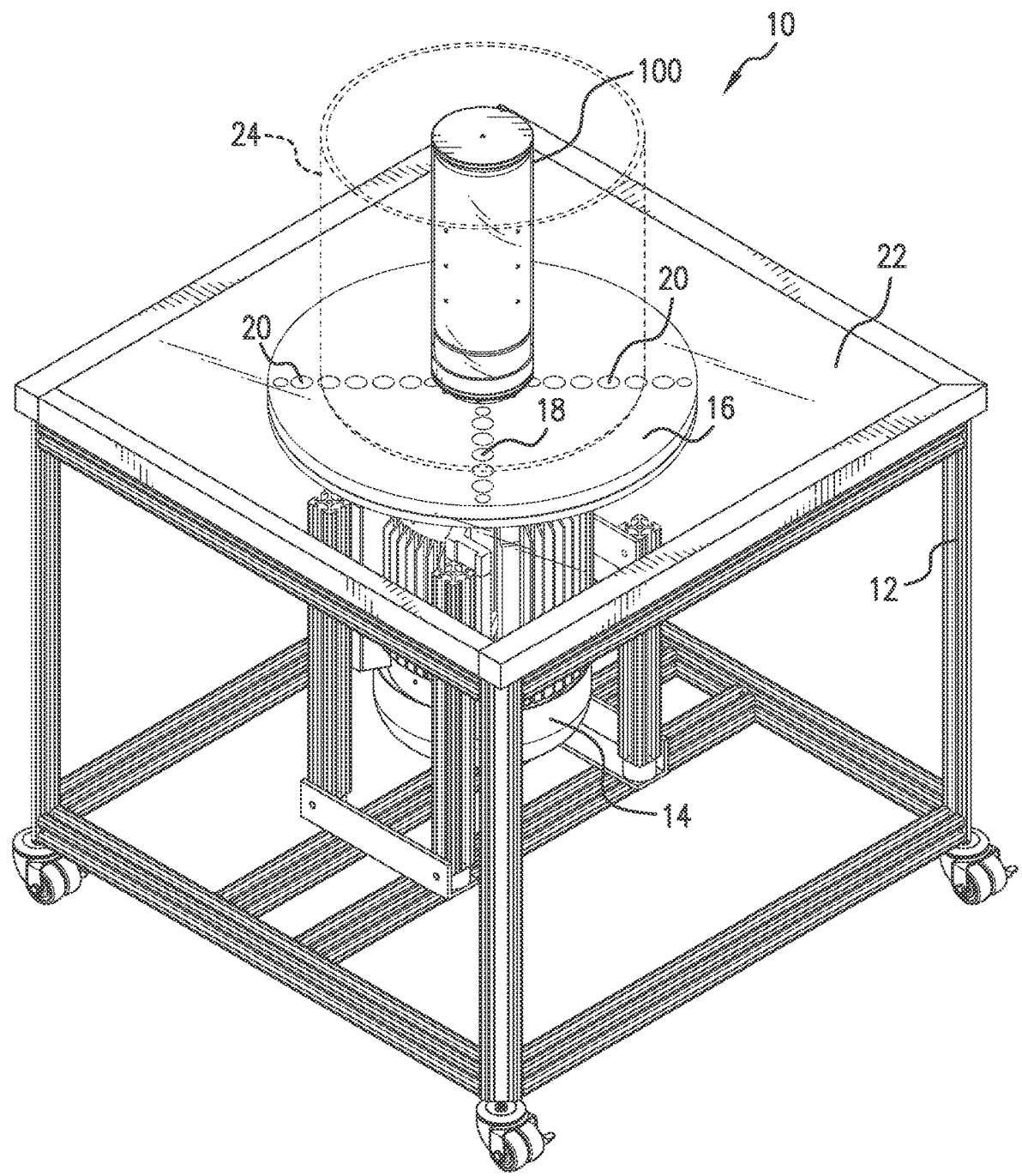
FIG. 1 is a perspective view illustrating a magnetic barrel tumbler comprising a self-contained filter assembly in accordance with the present invention.

Referring to FIG. 1, shown is a perspective view illustrating a magnetic barrel tumbler 10 comprising a filter assembly 100 in accordance with the present invention. Magnetic barrel tumbler 10 comprises of a motor frame 12 in which a motor 14 is placed. Attached to a shaft of motor 14 is a magnetic disc 16 that can be rotated at a high speed by the motor 14. On the upper surface of magnetic disc 16 are disposed N-polarity magnets 18 and S-polarity magnets 20 alternatingly arranged around magnetic disc 16. A plate 22 that is non-magnetic is disposed above magnetic disc 16 to provide separation between magnetic disc 16 and tub 24. Motor 14 can be an alternating current (AC) motor. The rotation speed of which can be freely controlled by a controller placed at the outer surface of motor frame 12.

Tub 24 receives magnetic particles comprising polishing pins, which can be implemented as small stainless steel cylinders the size of which is adjusted depending on the application. A fluid is provided in the tub to provide suspension of the workpieces. The fluid can be an aqueous solution comprising of water and a deburring solution. Tub 24, which is made of a non-magnetic material such as plastic, is positioned above magnetic disc 16 on top of plate 22 to provide spacing between the magnet disc 16 so that it is out of contact with the bottom of tub 24. Magnetic disc 16 is then rotated at high speed by motor 14.

The magnetic abrasive particles provided in tub 24 above magnet disc 16 are slightly magnetized and are attracted to magnet disc 16. Since magnet disc 16 is rotated at high speed, magnetic fields created by rotating magnet disc 16 momentarily alternate so that magnetic abrasive particles are attracted to an approaching magnetic field created by magnetic disc 16. As alternating different magnetic fields then approach magnetic abrasive particles, they jump around and helicopter inside and outside of every surface of the workpieces removing any burrs and polishing them in the process.

Figure 2:
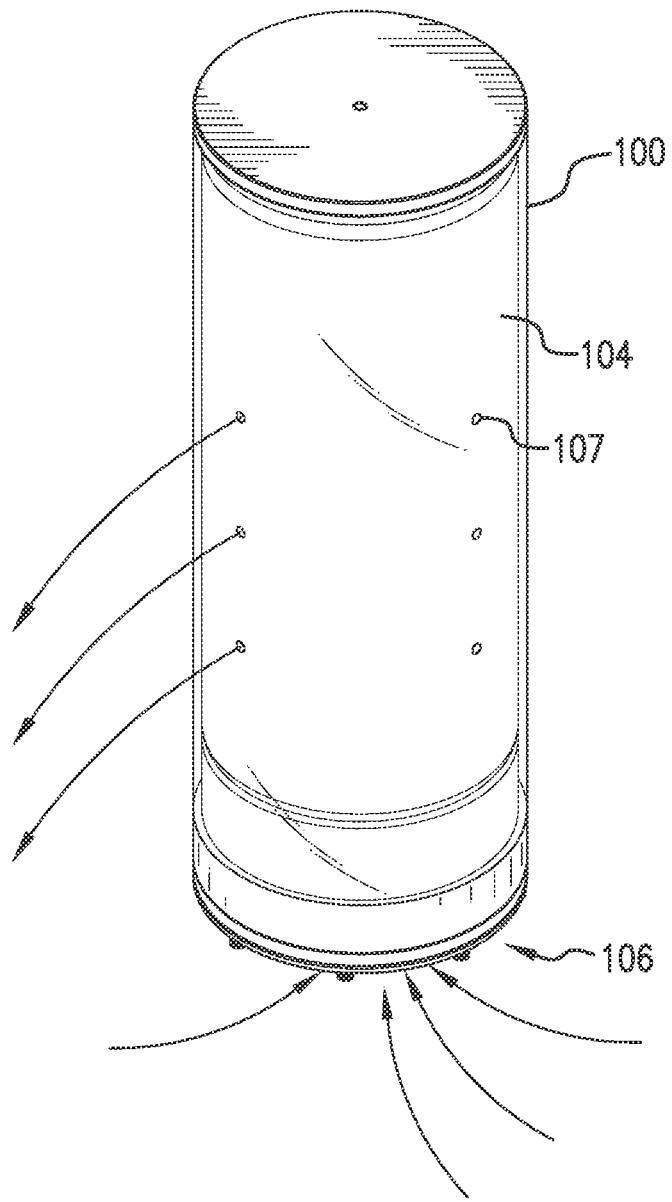
FIG. 2 is a perspective view illustrating the self-contained filter assembly of FIG. 1.
Figure 3:
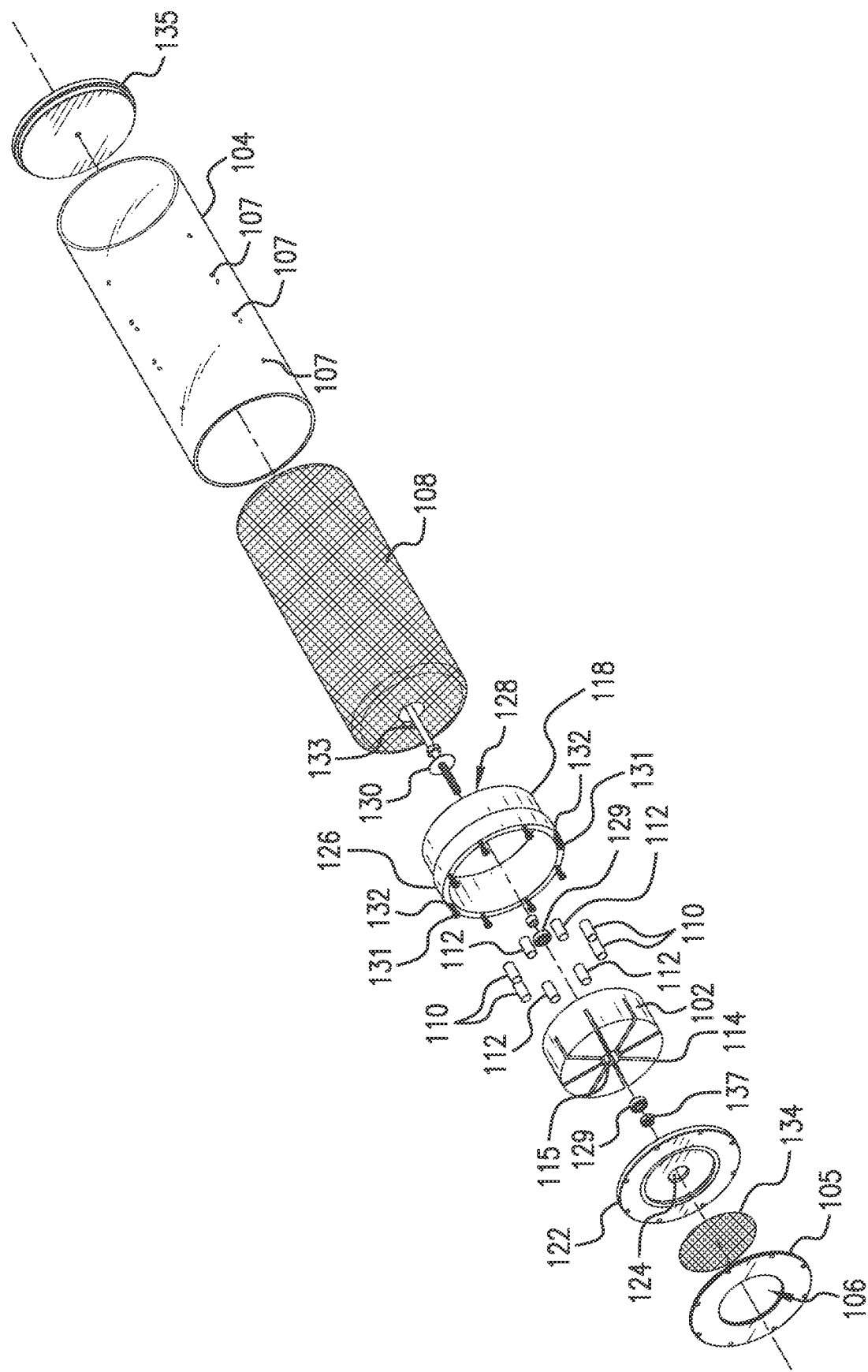
FIG. 3 is a rearward-perspective exploded view of the self-contained filter assembly of FIG. 2.
Figure 4:
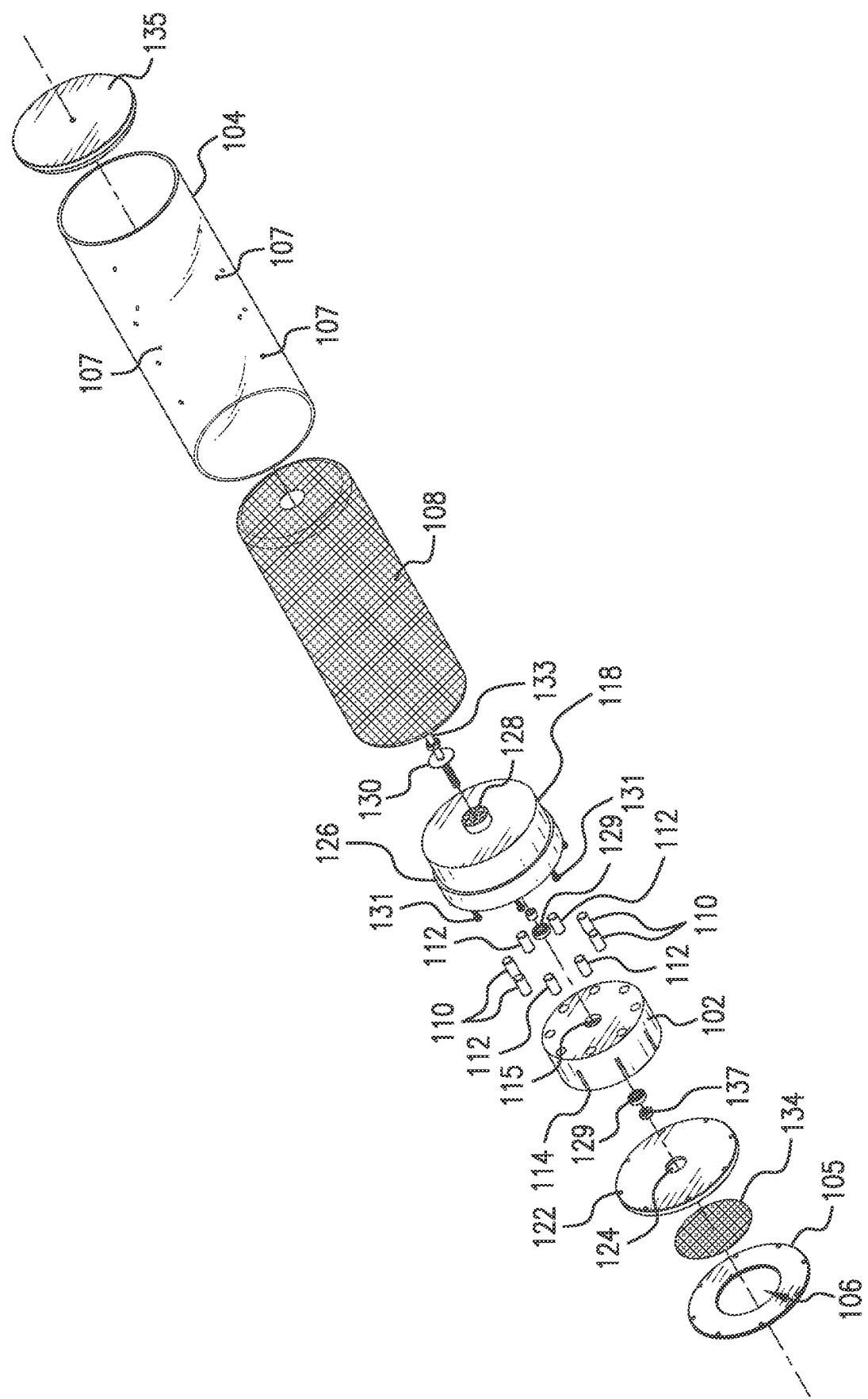
FIG. 4 is a frontward-perspective exploded view of the self-contained filter assembly of FIG. 2.

Inside tub 24 is placed filter assembly 100 to filter the aqueous solution to prevent discoloration of the workpieces, which is shown in FIGS. 2-4. Filter assembly 100 uses an impeller 102 positioned inside a filter housing 104 that is magnetically coupled to a rotating magnetic field created by magnetic disc 16 to rotate impeller 102. Impeller 102 draws the aqueous solution through an inlet 106 in the bottom of filter housing 104 into filter assembly 100 and returns clean water out outlet(s) 107 on the side of filter housing 104 back into tub 24.

More specifically, filter assembly 100 is cylindrically shaped and comprises of filter housing 104 which has a lower cover 105 comprising an inlet 106 and an outlet 107 configured as a plurality of holes around its side. A filter 108 is disposed inside filter housing 104 between impeller 102 and outlet 107. In implementation, filter housing 104 can be configured as cylindrical to correspond to a filter 108 that is also cylindrically shaped to fit over the top thereof. Impeller 102 positioned inside filter housing 104 is magnetically coupled to the rotating magnetic field created by magnetic disc 16 to rotate impeller 102 and draw fluid through inlet 106 of filter housing 104 and push fluid out the plurality of holes that can define outlet 107 of filter housing 104.

Impeller 102 can be formed of a solid piece of material with bores cylindrically spaced around the perimeter to receive alternating N-polarity magnets 110 and S-polarity magnets 112. Magnets 110, 112 correspond with and are magnetically coupled to magnets 18, 20 in magnetic disc 16. In this manner, the rotating reverse polarity of magnets 110, 112 with magnets 18, 20 causes impeller 102 to rotate. A plurality of slits 114 can be formed in impeller 102 that extend from an outer diameter surface of impeller 102 to a concentric through hole 115 through the center. These slits 114 form the blades of impeller 102. Rotational energy from the rotating impeller 102 increases the fluid's velocity and pressure. The number of slits 114 can correspond with the number of magnets 110, 112.

Impeller 102 is positioned inside impeller housing 118, which is positioned between inlet 106 of filter housing 104 and filter 108. Impeller housing 118 comprises of a lower cover 122 comprising an opening 124 aligned with inlet 106 of filter housing 104 and a top cover 126 comprising an opening 128 through which fluid is pushed out of impeller housing 118 to filter 108. Impeller 102 can be cylindrically shaped to fit inside impeller housing 118 also of cylindrical shape. Impeller 102 has an outer diameter surface which is less than an internal diameter of impeller housing 118, or more specifically, of an internal diameter of top cover 126 of impeller housing 118. This leaves a space between the outer diameter of impeller 102 and the inner wall of top cover 126. Rotation of impeller 102 draws fluid through inlet 106 of filter housing 104 and accelerates the fluid to toward the outer diameter of impeller 102 and out opening 128 in top cover 126 of impeller housing 118 to filter 108.

To assist in rotation of impeller 102 with respect to impeller housing 118, one or more bearings 129 can be positioned inside hole 115 of impeller 102 with a spacer 131 to separate lower cover 122 and top cover 126 from impeller 102.

In an embodiment, opening 128 in top cover 126 of impeller housing 118 can be covered by a one-way valve 130 that allows fluid out of opening 128 but not back through. In an embodiment, one-way valve 130 can be implemented as a rubber gasket that moves upward when fluid is accelerated out of opening 128 and retracts to cover opening 128 when impeller 102 slows down.

In an embodiment, a filter 134 can be positioned between inlet 106 of filter housing 104 and impeller 102 to filter fluid being drawn into inlet 106 before it reaches impeller 102. This filter can be placed either inside impeller housing 118 between lower cover 122 and impeller 102, or, as shown outside of impeller housing 118 after lower cover 105 for filter housing 104.

Inside filter assembly 100 is rod 133 that is used to lock the whole filter assembly 100 together. Rod 133 can be connected at one end to a cover 135 of filter housing 104 extend through filter 108 and impeller 102, and connected to a lock nut 137 at its other end. Screws 132 are used to attach lower cover 105 to impeller housing 118.

Filter assembly 100 is positioned inside tub 24. In an embodiment, inlet 106 is preferably on the bottom surface of filter assembly 100. In such an embodiment, filter assembly needs to be elevated off the bottom surface of tub 24. A spacer 131 near inlet 106 of filter housing 104 raises inlet 106 off the bottom of tub 24 a sufficient distance to receive fluid through inlet 106 yet block workpieces from entering inlet 106 of filter housing 104.

In an embodiment, a plurality of screws 132 attach lower cover 105 of the filter housing 104 to impeller housing 118. The heads of screws 132 can comprise spacer 131 to raise inlet 106 of filter housing 104 a sufficient distance to receive fluid through inlet 106 yet block workpieces from entering inlet 106 of filter housing 104.

In operation, the spinning impeller 102 accelerates the water radially along slits 114 creating a higher pressure around the outer diameter and a lower pressure at the center. The higher pressure is directed by the impeller housing 118 to opening 128 at the top of impeller housing 118 and into filter 108. The lower pressure at the center draws more water through inlet 106. The diameter of impeller 102 is kept at a minimum to keep the overall diameter of filter assembly 100 at a minimum so as to not use too much of the tub, but still allow enough pressure to be created to push the dirty water through filter assembly 100. The size of slits 114 and number of slits 114 is designed to provide the correct flowrate needed to filter the water at around 3 gallons per minute in both clockwise and counterclockwise operation. The number, position and size of magnets 110, 112 must provide enough magnetic coupling to accelerate impeller 102 and 3 gallons per minute of water.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A filter assembly for a magnetic barrel tumbler, the magnetic barrel tumbler comprising a motor, a magnetic disc attached to the motor, a plate positioned above the magnetic disc, and a tub positioned on top of the plate for receiving a solution, magnetic particles, and work pieces, the filter assembly positionable in the tub, the filter assembly comprising:
   a filter housing, adapted to be positioned in the tub of the magnetic barrel tumbler, comprising an inlet and an outlet;
   an impeller positioned inside the filter housing adapted to be magnetically coupled to a rotating magnetic field created by a rotation of the magnetic disc by the motor of the magnetic barrel tumbler to rotate the impeller and draw the solution through the inlet of the filter housing and push the solution out the outlet of the filter housing, wherein the impeller comprises a solid piece of material with an outer diameter wall, a concentric through hole, a plurality of bores cylindrically spaced around a perimeter of the solid piece of material, and a plurality of slits extending from the outer diameter wall of the impeller to the concentric through hole;
   a plurality of magnets each of which is positioned in one of the plurality of bores in the impeller; and
   a first filter disposed between the impeller and the outlet of the filter housing to filter the solution inside the tub of the magnetic barrel tumbler.

2. The filter assembly of claim 1, wherein the plurality of magnets are adapted to magnetically couple the impeller to the rotating magnetic field created by the rotation of the magnetic disc by the motor of the magnetic barrel tumbler.

3. The filter assembly of claim 2, and further comprising an impeller housing positioned between the inlet of the filter housing and the first filter for retaining the impeller.

4. The filter assembly of claim 3, wherein the impeller housing further comprises: a lower cover comprising an opening aligned with the inlet of the filter housing, a top cover comprising an opening through which the solution is pushed out of the impeller housing to the first filter, wherein the impeller is positioned inside the impeller housing between the lower cover and the top cover with a space between the outer diameter wall of the impeller and an inner wall of the impeller housing, and wherein rotation of the impeller draws the solution through the inlet of the filter housing and accelerates the solution toward the outer diameter wall of the impeller and out the opening in the top cover to the first filter.

5. The filter assembly of claim 1, wherein the plurality of slits corresponds to the plurality of magnets.

6. The filter assembly of claim 4, and further comprising a one-way valve positioned between the opening in the top cover of the impeller housing and the first filter.

7. The filter assembly of claim 6, wherein the one-way valve comprises a rubber gasket that moves upward when the solution is accelerated out the opening in the top cover of the impeller housing.

8. The filter assembly of claim 3, and further comprising: a bearing positioned in the concentric through hole that extends through the impeller; and a rod extending through the concentric through hole to combine the impeller housing to the filter housing.

9. The filter assembly of claim 1, and further comprising a second filter positioned between the inlet of the filter housing and the impeller to filter the solution being drawn into the inlet of the filter housing before it reaches the impeller.

10. The filter assembly of claim 1, and further comprising a spacer near the inlet of the filter housing to raise the inlet of the filter housing a sufficient distance to receive the solution through the inlet of the filter housing yet block the work pieces from entering the inlet of the filter housing.

11. The filter assembly of claim 10, wherein the filter housing further comprises of a lower cover and an outer cover; and wherein the filter assembly further comprises of an impeller housing for housing the impeller; and wherein the spacer comprises a plurality of screws to attach the lower cover of the filter housing to the impeller housing, wherein each of the plurality of screws comprises a head which raise the inlet of the filter housing the sufficient distance to receive the solution through the inlet of the filter housing yet block the work pieces from entering the inlet of the filter housing.

12. The filter assembly of claim 11, and further comprising a second filter positioned between the lower cover of the filter housing and the impeller housing.

13. The filter assembly of claim 8, wherein the rod extends through the bearing and combines a top of the filter housing to a bottom of the filter housing.

14. The filter assembly of claim 13, wherein the plurality of magnets are positioned apart from the concentric through hole of the impeller and apart from the rod that extends through the bearing in the concentric through hole of the impeller.

15. The filter assembly of claim 4, further comprising a one-way valve positioned on top of the opening in the top cover of the impeller housing to prevent the solution from flowing back into the impeller housing.

16. The filter assembly of claim 1, and further comprising a spacer on a bottom of the filter housing to raise the inlet of the filter housing a sufficient distance off a bottom of the tub to receive the solution through the inlet of the filter housing yet block the work pieces from entering the inlet of the filter housing.

17. The filter assembly of claim 1, wherein the inlet of the filter housing is at a bottom of the filter housing and concentric with the impeller and the outlet of the filter housing is at a side of the filter housing perpendicular to the inlet so that the impeller draws the solution through the inlet at the bottom of the filter housing concentric with the impeller and pushes the solution radially out the outlet of the filter housing.

18. The filter assembly of claim 17, wherein the outlet of the filter housing is configured to be above a level of the solution in the tub for the impeller to push the solution radially out the outlet of the filter housing above the level of the solution in the tub.

19. The filter assembly of claim 18, wherein each of the plurality of slits extend partially up the outer diameter wall and along a bottom surface of the solid piece of material to the concentric through hole in the solid piece of material, wherein each of the plurality of slits are positioned with a corresponding bore of the plurality of bores between adjacent slits.

20. The filter assembly of claim 19, wherein the impeller is positioned inside an impeller housing between a lower cover and a top cover with a space between the outer diameter wall of the impeller and an inner wall of the impeller housing, and wherein rotation of the impeller draws the solution through the inlet of the filter housing and accelerates the solution out the plurality of slits toward the outer diameter wall of the impeller and out an opening in the top cover of the impeller housing to the first filter.

* * * * *